June 18, 1968  H. G. MOTHERSHAW  3,388,785
CONVEYOR LOADERS

Filed Dec. 8, 1966  3 Sheets-Sheet 1

June 18, 1968  H. G. MOTHERSHAW  3,388,785
CONVEYOR LOADERS
Filed Dec. 8, 1966
3 Sheets-Sheet 2
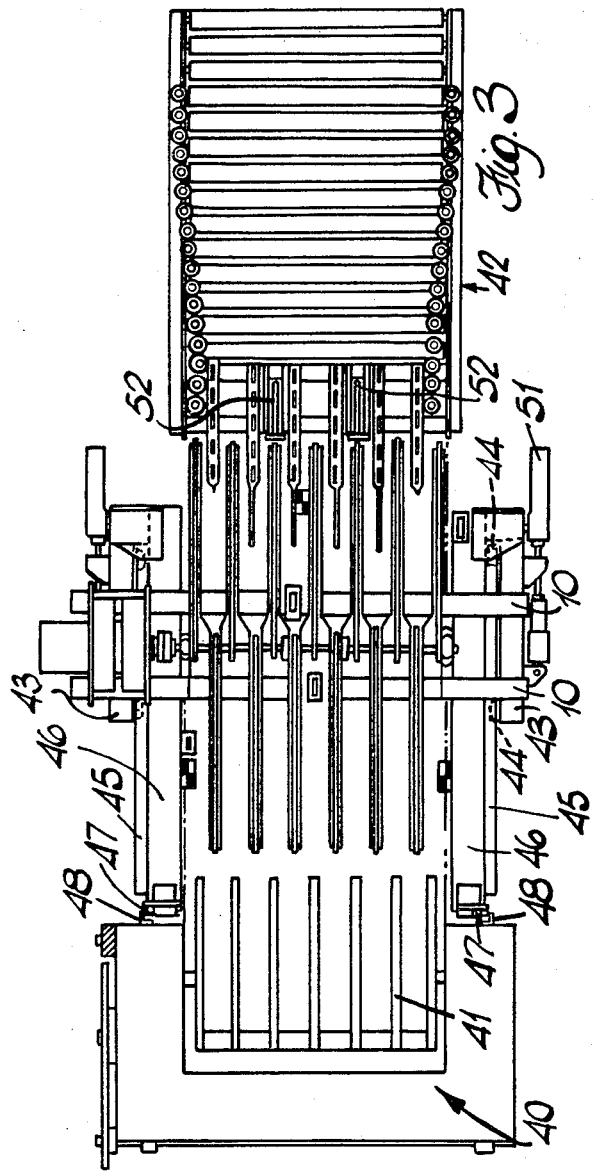
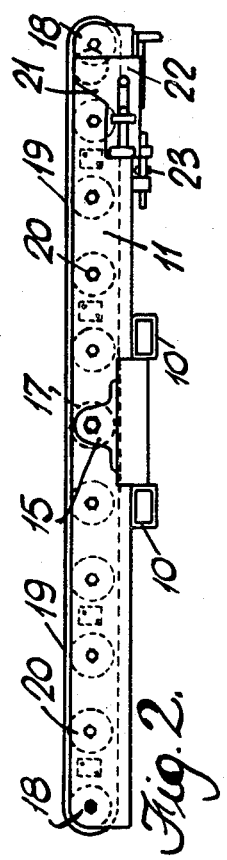

June 18, 1968 H. G. MOTHERSHAW 3,388,785
CONVEYOR LOADERS

Filed Dec. 8, 1966 3 Sheets-Sheet 3

United States Patent Office 3,388,785
Patented June 18, 1968

3,388,785
CONVEYOR LOADERS
Harold George Mothershaw, Hilton, England, assignor to George Orton Sons and Spooner Limited, Victoria, Crescent, Burton-on-Trent, England, a British company
Filed Dec. 8, 1966, Ser. No. 600,120
Claims priority, application Great Britain, Dec. 30, 1965, 55,187/65
6 Claims. (Cl. 198—190)

ABSTRACT OF THE DISCLOSURE

A conveyor loader for effecting transfer of articles between a vertically movable conveyor having spaced forked load carrying platforms and a substantially horizontal conveyor, the loader having a plurality of endless flexible load supporting members extending on opposite sides of a base member of the loader, the load supporting members being capable of passing between the forks of the platforms of the vertical movable conveyor and the conveyor loader being movable vertically and also horizontally to effect loading and unloading of articles onto the conveyors.

---

This invention relates to conveyor loaders of the kind intended to be used when it is required to transfer articles from one conveyor to another and has for its object to provide such a loader in a simple and convenient form.

Figure 1:
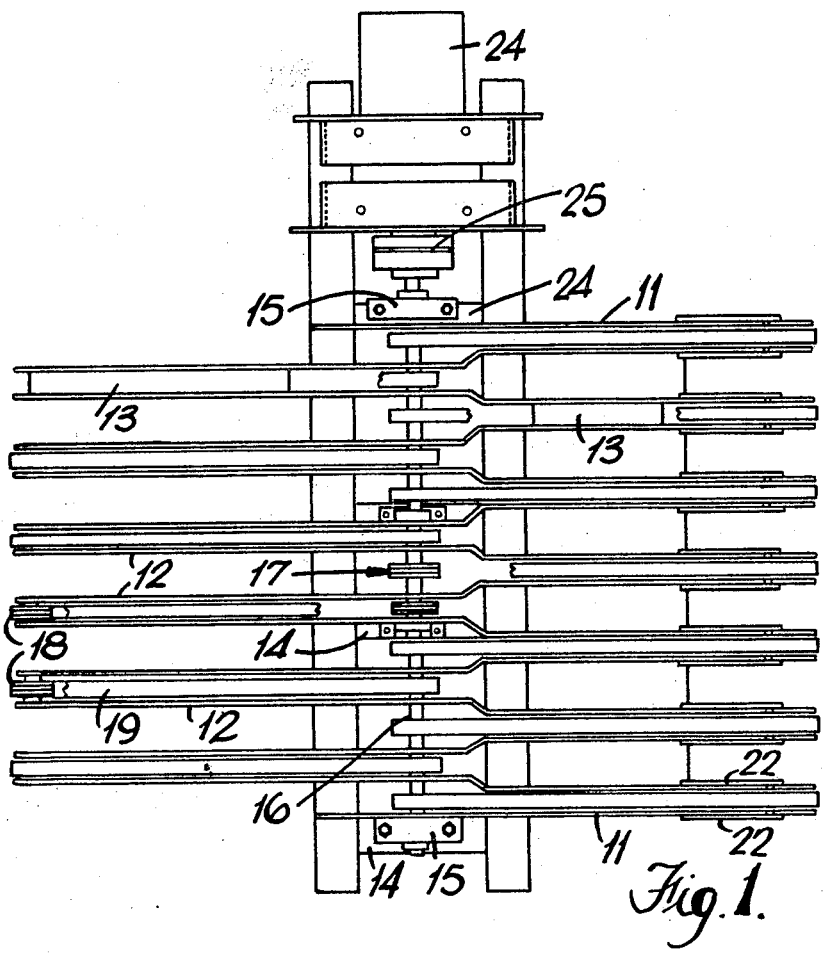
Figure 4:
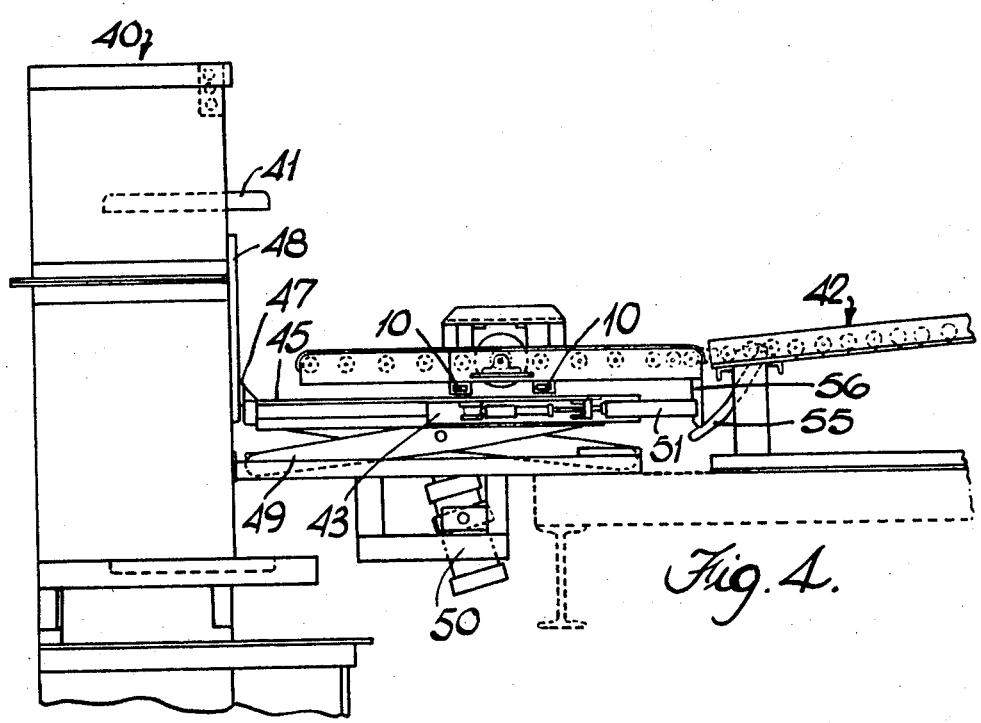
Figure 5:
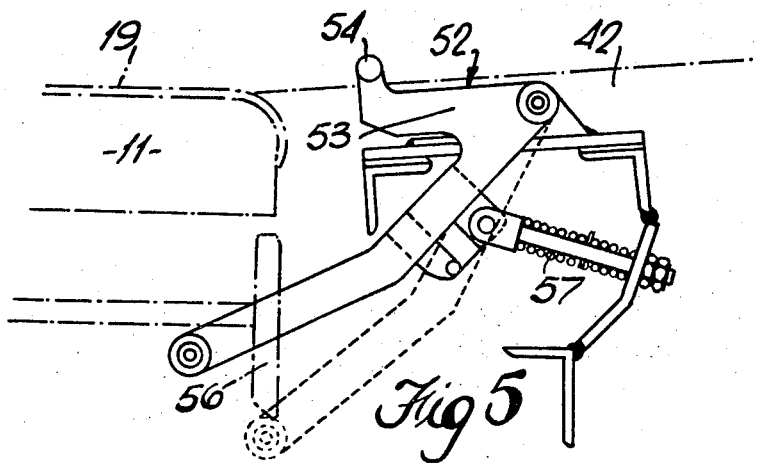

One example of a loader in accordance with the invention will now be described with reference to the accompanying drawings in which:

FIGURE 1 is a plan view of one example of a conveyor loader in accordance with the invention, FIGURE 2 is a side elevation of the loader shown in FIGURE 1, FIGURE 3 is a plan view of one example of a conveyor system incorporating the conveyor loader shown in FIGURE 1, FIGURE 4 is a side elevation of the conveyor system shown in FIGURE 3, and FIGURE 5 is a side view to an enlarged scale of part of the system shown in FIGURES 3 and 4.

Referring to the drawings there is provided a pair of spaced rectangular hollow section base members 10 which extend laterally with respect to the conveyor and beyond the side limits of the conveyor. Also provided are a pair of side supporting plates 11 which are welded or otherwise secured to the base members 10 and which extend longitudinally of the conveyor in one longitudinal direction only. Moreover, the side supporting plates 11 are positioned on opposite sides respectively of the conveyor. Also provided are a plurality of pairs of intermediate supporting plates 12 which are formed as flat strips which are cranked intermediate their ends. The intermediate support plates are welded or otherwise secured to the base members 10 and are spaced laterally between the side supporting plates 11. Moreover, the plates of each pair of supporting plates are of opposite hand and the pairs of plates are positioned so that the narrower spaces between the plates extend towards the end of the conveyor opposite to that to which the side supporting plates extend. By this arrangement substantially equal but laterally offset spaces are defined between a side supporting plate 11 and the adjacent intermediate supporting plate on one side of the base members 10, the plates of a pair of intermediate supporting plates on the other side of the base members, and the adjacent plates of an adjacent pair of intermediate support plates on said one side of the base members. Furthemore, strengthening of the portion of the plates 11 and 12 which extend beyond the base members 10 is achieved by cross plates 13 which are welded or otherwise secured to the lower edges of the plates 11 and 12 and extend within the aforesaid spaces.

Extending between the base members 10 are four journal bearing support plates 14 which are spaced laterally across the conveyor, the outmost pair being positioned beyond the side supporting plates 11 respectively. The support plates 14 each carry a journal bearing housing 15 and these are mounted on the support plates 14 respectively in a manner to permit of relative longitudinal adjustment. Carried by the housing 15 are journal bearings which support a rotary shaft 16. Moreover, non-rotatably secured on the shaft are a plurality of grooved driving pulleys 17 the pulleys being positioned so that they are aligned with the aforementioned spaces respectively.

The portions of the pairs of intermediate supporting plates which extend to the left of the base members 10 as shown in FIGURE 1 carry at their ends, grooved idling pulleys 18 respectively and extending around these pulleys and the corresponding driving pulleys 17 are load supporting members defined by flexible driving belts 19. Moreover, intermediate these pulleys the upper run of each driving belt is supported by spaced pulleys 20, there being provided in the particular example, four such pulleys. If desired and if the loads are heavy the driving belts may be replaced by chains in which case all the pulleys which have been mentioned will be sprockets.

The portions of the pairs of intermediate supporting plates 11 which extend to the right of the base member 10 and where applicable the side supporting plates 11 carry at their ends respectively a tensioning assembly 21 which also carries a grooved idling pulley 18. The tensioning assembly includes side plates 22 which are mounted on the supporting plate for longitudinal movement and a screw mechanism 23 is provided whereby the setting of the tensioning assembly can be varied. As with the case of the portions of the supporting plates which extend to the left driving belts 19 are provided as also are the spaced pulleys 20.

Also mounted on the base members 10 is an electric motor 24 the output shaft of which is connected to the shaft 16 by means of a flexible coupling 25. In use, when the motor is operating the upper runs of the driving belts move in the same direction and the conveyor can be used to transfer packages as required. In order to adjust the tension of the belts the journal bearing supports 15 are slackened relative to their support plates 14 and then the tension of the belts is adjustable by adjusting the tensioning assemblies. When the correct tension has been achieved the bearing supports 15 are tightened down onto their respective support plates 14.

Such a conveyor loader as described above can be used for conveying articles between a substantially horizontal conveyor and a vertically moving conveyor. An example of such an arrangement will be described with reference to FIGURES 3 and 4. As shown the vertically movable conveyor is indicated at 40 and includes forked load carrying platforms 41 and the substantially horizontal conveyor is indicated at 42. As shown the conveyor 42 declines towards the conveyor loader. At this point it is convenient to consider the possible combinations of the conveyor system and to describe the sequence of events and then to describe the actual mechanism which moves the conveyor loader.

There are four possible transfer arrangements which can occur, these are:

(1) Transfer of articles onto the conveyor 40 whilst it is moving upwardly.

(2) Transfer of articles off the conveyor 40 whilst it is moving upwardly.

(3) Transfer of articles onto the conveyor 40 whilst it is moving downwardly.

(4) Transfer of articles off the conveyor 40 whilst it is moving downwardly.

Considering arrangement 1 with an article on the belts 19 of the loader it is only necessary to move the loader as a unit towards the conveyor so that the article lies in the path of the load carrying platforms 41. The forks of the load carrying platform as they move upwardly, lift the articles from the belts 19 and the transfer is completed. Subsequently the loader is moved away from the conveyor 40 to receive another article from the conveyor 42 and the process is repeated.

Arrangement 4 involves similar movements but in this case the loader is positioned in the path of the downwardly moving load carrying platforms and the article is deposited on the belts 19. The loader is then moved towards the conveyor 42 and at the same time the article is moved on the loader in the same direction. If desired however, the loader may be permanently positioned in the path of the load carrying platforms with the belts permanently in operation and with the conveyor 42 suitably positioned to receive the articles.

Arrangements 2 and 3 involve upward and downward movements of the loader and also transverse movement. In the arrangement 2, the loader starts in the position in which it is shown in FIGURE 4. As soon as one of the platforms 41 has attained a level which is slightly above the loader, the latter is moved towards the conveyor 40 and when it has reached its limit of movement in this direction the loader is moved upwardly at a speed which is greater than the speed at which the platforms 41 are moving. This movement lifts the articles from the platforms 41 and then the loader is moved away from the conveyor and the belts 19 are moved in the same direction to discharge the articles onto the conveyor 42. This may take place whilst the loader is in the raised position or alternatively and as shown, the loader is lowered before the transfer is effected. Subsequently the loader is moved towards the conveyor 40 and the cycle is repeated.

In arrangement 3 the articles are received onto the loader whilst it is in the position shown in FIGURE 2 and then the loader is raised and moved towards the conveyor 40 when a platform 41 is just below the upper level of the loader. The belts of the load are moved in a direction so that the article is disposed in the path of the platforms 41 and then the loader is lowered at a rate which is higher than the rate at which the platforms 41 are moving downwardly. In this manner the article is deposited onto the particular load carrying platform and as soon as the transfer is completed the loader is moved away from the conveyor 40 ready for another cycle of operation.

Referring now to FIGURES 3 and 4 of the drawings the base members 10 of the loader are mounted at their opposite ends respectively upon a pair of links 43 each of which carries a pair of rollers 44 which roll upon a pair of tracks constituted by open channel members 45 positoned with their open sides directed outwardly of the loader. The members 45 are secured to a pair of frame members 46 which are guided for vertical movement by means of rollers 47 which are engaged within tracks 48 secured to the framework of the conveyor 41. The members 46 are connected by a pair of scissors linkages 49 respectively to a supporting structure of the conveyor 42 and to the framework of the conveyor 41.

For expanding the scissors linkages 49 a fluid operable piston cylinder combination 50 is provided the cylinder of which is pivotally mounted relative to the loader, and the piston of which is pivotably connected to a transverse pin extending between the scissors linkages. When the cylinder is supplied with fluid under pressure the linkages 49 are expanded and the loader is raised. For moving the loader in the horizontal direction a double acting fluid pressure operable piston cylinder combination 51 is provided.

As has been mentioned, the arrangement shown in FIGURES 3 and 4 is for loading articles from the conveyor 42 onto the downwardly moving load carrying platforms of the conveyor 40. The conveyor 42 is of the gravity roller type so that articles placed thereon will move under the action of gravity onto the loader. Clearly when the loader is not in the correct position for receiving the articles then the movement of the articles must be halted. For this purpose there is provided at the end of the conveyor 42 a pair of stops 52.

As shown in FIGURE 5 each stop comprises a bell crank lever 53 one arm 54 of which extends in the direction of movement of the articles on the conveyor 42. This arm is provided with an upstanding stop piece 54 which can be moved into the path of articles on the conveyor. The other arm 55 of the bell crank lever extends towards the loader and the two arms 55 are interconnected by a transversely extending rod (not shown). The rod is arranged to be contacted by a push piece 56 which is movable with the loader. When the loader is in the correct position the push piece 56 moves the rod so that the bell crank lever is moved to a position in which the stop piece 52 is moved out of the path of articles on the conveyor 42. When the loader is moved to effect the transfer as has been described the bell crank lever is moved to the position in which movement of articles on the conveyor 42 is prevented by means of a coiled compression spring 57.

Having thus described my invention what I claim as new and desire to secure by Letters Patent is:

1. A conveyor loader comprising in combination, a base member, a rotary shaft adjustably supported on the base member, a plurality of driving wheels mounted on and secured to the shaft in axially spaced relationship to each other, first and second sets of idling wheels disposed on opposite sides of the base member respectively, the idling wheels of the first set being aligned respectively with alternate driving wheels and the idling wheels of the second set being aligned with the remaining driving wheels, a plurality of endless flexible load supporting members extending respectively around the aligned pairs of wheels, a pair of plate like outer support members mounted on said base member and extending respectively adjacent the outermost sides of the outermost pair of idling wheels, a plurality of plate like intermediate support members mounted on said base member and extending on opposite sides thereof, said intermediate support members being cranked on one side of said base member so that the ends of each intermediate support member are disposed adjacent one of each set of idling wheels respectively, tensioning means mounting one of said sets of idling wheels relative to the support members whereby the tension of the flexible load supporting members can be adjusted and means for rotating said shaft to effect movement of said load supporting members.

2. A conveyor loader according to claim 1 including spaced journal bearings for said shaft, housings accommodating said journal bearings respectively and means adjustably retaining said housings relative to the base member.

3. A conveyor loader according to claim 2 in which said base member comprises a pair of spaced box members extending transversely to the direction of movement of said load supporting members.

4. A conveyor loader according to claim 3 including a pair of spaced tracks which extend in the direction of movement of the load supporting members and which are positioned outwardly of the outer plate like support members, means supporting said spaced tracks, a pair of links positioned outwardly of said track and connected to said box members and pairs of spaced rollers carried by said links respectively and engaging said tracks whereby the loader can be moved in the direction of movement of the load supporting members.

5. A conveyor loader according to claim 4 including double acting fluid pressure operable piston cylinder combinations acting intermediate the tracks and said links respectively for effecting movement of the loader.

6. A conveyor loader according to claim 5 in which the means supporting said spaced tracks comprises a pair of scissors linkages respectively, and including means operable to expand said scissors linkages thereby to effect vertical movement of the loader and means for guiding the vertical movement of the loader.

References Cited

UNITED STATES PATENTS

| 2,280,136 | 4/1942 | Webster | 198—76 |
| 2,631,715 | 3/1953 | Vickers | 198—139 |
| 3,289,811 | 12/1966 | Kelly | 198—35 |

FOREIGN PATENTS

| 37,776 | 8/1923 | Norway. |

RICHARD E. AEGERTER, *Primary Examiner.*